(12) United States Patent
Otte

(10) Patent No.: US 10,089,550 B1
(45) Date of Patent: Oct. 2, 2018

(54) SPORTS VIDEO DISPLAY

(71) Applicant: William F. Otte, Boise, ID (US)

(72) Inventor: William F. Otte, Boise, ID (US)

(*) Notice: Subject to any disclaimer, the term of this patent is extended or adjusted under 35 U.S.C. 154(b) by 547 days.

(21) Appl. No.: 13/645,488

(22) Filed: Oct. 4, 2012

Related U.S. Application Data (63) Continuation-in-part of application No. 13/588,781, filed on Aug. 17, 2012, now abandoned.

(60) Provisional application No. 61/642,994, filed on May 4, 2012, provisional application No. 61/524,684, filed on Aug. 17, 2011, provisional application No. 61/642,994, filed on May 4, 2012.

(51) Int. Cl.
| | | |
|---|---|---|
| G06K 9/46 | (2006.01) | |
| G11B 27/036 | (2006.01) | |
| H04N 21/234 | (2011.01) | |
| G06K 9/62 | (2006.01) | |
| H04N 21/854 | (2011.01) | |
| H04N 21/81 | (2011.01) | |

(52) U.S. Cl.
CPC .............. *G06K 9/46* (2013.01); *G11B 27/036* (2013.01); *H04N 21/234* (2013.01); *G06K 9/62* (2013.01); *H04N 21/81* (2013.01); *H04N 21/854* (2013.01)

(58) Field of Classification Search
USPC .................................................. 348/157, 578
See application file for complete search history.

(56) References Cited

U.S. PATENT DOCUMENTS

| | | | |
|---|---|---|---|
| 3,741,662 A | | 6/1973 | Pioch |
| 4,155,095 A | * | 5/1979 | Kirschner ............... A63F 13/00 345/593 |
| 4,665,432 A | * | 5/1987 | Shima .................... H04N 5/208 348/625 |
| 5,491,517 A | | 2/1996 | Kreitman et al. |
| 5,543,856 A | | 8/1996 | Rosser et al. |
| 5,912,700 A | * | 6/1999 | Honey et al. .................. 348/157 |

(Continued)

FOREIGN PATENT DOCUMENTS

| | | |
|---|---|---|
| DE | 19837887 A1 | 2/2000 |
| FR | 2730837 A1 | 8/1996 |

(Continued)

OTHER PUBLICATIONS

Cowden, Steve, How the first and 10 line works, Feb. 5, 2005, SportVision, http://www.sportvision.com/news/how-first-and-10-line-works.*

(Continued)

*Primary Examiner* — Noel R Beharry
*Assistant Examiner* — Rodrick Mak
(74) *Attorney, Agent, or Firm* — Parry IP PLLC; Jeffrey C. Parry (57) ABSTRACT

A system and method of producing and superimposing information graphics that relate to a sporting event. The information graphics may be superimposed on the playing surface during an athletic competition, a racetrack during a motorsports race, and the like. The information graphics may comprise a superimposed first down line that corresponds to a football team's colors. The information graphics may comprise a superimposed perimeter that borders the playing surface and corresponds to a team's colors. Additional embodiments include an information display graphic that quickly provide critical information to viewers.

8 Claims, 4 Drawing Sheets

(56) References Cited

U.S. PATENT DOCUMENTS

| | | | |
|---|---|---|---|
| 5,917,553 A | 6/1999 | Honey et al. | |
| 6,012,228 A | 1/2000 | Fisanich | |
| 6,046,710 A * | 4/2000 | Holden | G02B 27/60 345/6 |
| 6,100,925 A | 8/2000 | Rosser et al. | |
| 6,141,060 A | 10/2000 | Honey et al. | |
| 6,208,387 B1 | 3/2001 | Magnusson et al. | |
| 6,229,550 B1 * | 5/2001 | Gloudemans et al. | 345/641 |
| 6,373,530 B1 | 4/2002 | Birks et al. | |
| 6,466,275 B1 * | 10/2002 | Honey et al. | 348/722 |
| 6,597,406 B2 * | 7/2003 | Gloudemans et al. | 348/587 |
| 6,751,880 B1 * | 6/2004 | Amron et al. | 33/289 |
| 6,851,198 B1 | 2/2005 | Harty | |
| 6,907,840 B1 | 6/2005 | Gaines | |
| 7,116,342 B2 * | 10/2006 | Dengler et al. | 345/630 |
| 7,154,540 B2 * | 12/2006 | Honey et al. | 348/222.1 |
| 7,185,439 B1 | 3/2007 | Nubin et al. | |
| 7,224,403 B2 | 5/2007 | Bowden | |
| 7,230,653 B1 | 6/2007 | Overton et al. | |
| 7,231,651 B2 | 6/2007 | Pong | |
| 7,596,759 B2 * | 9/2009 | Verna | 715/772 |
| 7,752,642 B2 * | 7/2010 | Lemmons | H04N 7/17318 725/32 |
| 2001/0005218 A1 * | 6/2001 | Gloudemans | H04N 5/272 348/157 |
| 2002/0080275 A1 * | 6/2002 | Bates | H04N 5/4401 348/553 |
| 2004/0111903 A1 | 6/2004 | Amron | |
| 2004/0195768 A1 * | 10/2004 | Poulos | 273/244 |
| 2005/0018085 A1 * | 1/2005 | Bowden | H04N 5/44513 348/577 |
| 2005/0244050 A1 * | 11/2005 | Nomura | H04N 13/0048 382/154 |
| 2008/0281443 A1 * | 11/2008 | Rodgers | A63B 71/0605 700/91 |
| 2008/0312002 A1 | 12/2008 | Cengarle et al. | |
| 2009/0189982 A1 | 7/2009 | Tawiah | |
| 2009/0213270 A1 * | 8/2009 | Ismert | G06F 17/30799 348/575 |
| 2010/0238351 A1 * | 9/2010 | Shamur | G11B 27/036 348/598 |
| 2010/0315510 A1 | 12/2010 | Dunn et al. | |
| 2011/0013087 A1 * | 1/2011 | House | A63B 24/0021 348/564 |
| 2014/0363143 A1 * | 12/2014 | Dharssi | G06K 9/00765 386/282 |

FOREIGN PATENT DOCUMENTS

| | | |
|---|---|---|
| WO | 9726758 A1 | 7/1997 |
| WO | 9966717 A1 | 12/1999 |

OTHER PUBLICATIONS

Public Domain, NFL Screencaptures, Feb. 2008-Feb. 2010 from Super Bowls.*

Askan Deutsch, Sports Broadcasting and Virtual Advertising: Defining the Limits of Copyright Law and the Law of Unfair Competition, 11 Marquette Sports Law Review (2000), pp. 42-86.*

Turner, Paul and Cusumano, Sam; Virtual Advertising: Legal Implications for Sport; 2000; Sport Management Review; 3; pp. 47-70.*

Arthur, Kenneth; NFL Review: Kenny Watches All 256 Games from 2011. This Week with Seahawks at Steelers; Jan. 24, 2012; http://www.fieldgulls.com/2012/1/24/2719913/nfl-review-kenny-watches-all-256-games-2011-seahawks-steelers; p. 17.*

* cited by examiner

SPORTS VIDEO DISPLAY

CROSS-REFERENCE TO RELATED APPLICATIONS

This application claims priority to U.S. Provisional Patent Application Ser. No. 61/642,994, filed May 4, 2012 and titled "Sports Video Display," and to U.S. patent application Ser. No. 13/588,781, filed Aug. 17, 2012 and titled "Sports Video Display," which application Ser. No. 13/588,781 claims priority to U.S. Provisional Patent Application Ser. No. 61/524,684, filed Aug. 17, 2011, and titled "Sports Video Display," the disclosures of which are hereby incorporated by reference in their entireties.

BACKGROUND

Technical Field

The present disclosure relates generally to systems and methods for providing information graphics related to a sporting competition shown on a video display. More particularly, the disclosure relates to graphics that provide information to viewers of sporting events in an engaging and visually pleasing manner.

Background

The proliferation of high-definition ("HD") television has led to dramatic advancements in the appearance of broadcast television. These advancements in television broadcasting and display technology have led to a large number of improvements pertinent to the presentation of television broadcasts. These improvements include advancements in the appearance of sporting events on television.

One of the goals of HD television is to make the displayed programming look sharp and brilliant to a viewer. Several improvements have been produced to enhance the viewers' experience. Included amongst these improvements are U.S. Pat. No. 7,224,403 to Bouden ("Bouden") and U.S. Pat. No. 6,141,060 to Honey et al. ("Honey"), both of which are incorporated herein by reference. Bouden discloses a method and apparatus for a television program to incorporate a score board that is color-coordinated to a corresponding team's uniform color. Similarly, Honey discloses the placement of a superimposed first down line on a football field. U.S. Pat. No. 7,231,651 to Pong, which is incorporated herein by reference in its entirety, provides a method of adding advertising or commercials to a user by inserting the images onto a transmission.

However, the foregoing references fail to provide a level of information that is useful to uneducated and/or inexperienced viewers of certain sports in an engaging and visually appealing manner. What is needed, therefore, is a system for providing information graphics that deliver a high degree of information to sporting event viewers in an engaging and visually pleasing manner.

SUMMARY

In one embodiment, a method of displaying information related to a football game is disclosed. The method includes superimposing a line of a selected color on a playing field and changing the color of the line to a new color to reflect a change of offensive possession in the football game. The line indicating a first down line initially has color that corresponds to a team color of a football team on offense in the football game. The new color corresponds to a team color of a second football team in the football game.

In another embodiment, a method of displaying information related to a sporting event between two teams is disclosed. The method includes superimposing a perimeter border around a playing surface. The perimeter border is composed of at least one color that corresponds to a team color of one of the two teams.

In yet another embodiment, a system for displaying information related to a sporting event between two teams is disclosed. The system includes means for identifying a position and a direction of a camera, means for inputting a selected team, and means for superimposing a perimeter border around a playing surface on which the sporting event is held. The perimeter border has a color that corresponds to a uniform color of the selected team.

The present disclosure will now be described more fully with reference to the accompanying drawings, which are intended to be read in conjunction with both this summary, the detailed description, and any preferred or particular embodiments specifically discussed or otherwise disclosed. This disclosure may, however, be embodied in many different forms and should not be construed as limited to the embodiments set forth herein; rather, these embodiments are provided by way of illustration only so that this disclosure will be thorough, and fully convey the full scope of the invention to those skilled in the art.

DETAILED DESCRIPTION

In the following description, reference is made to the accompanying drawings that form a part thereof, and in which is shown by way of illustration specific exemplary embodiments in which the invention may be practiced. These embodiments are described in sufficient detail to enable those skilled in the art to practice the invention, and it is to be understood that modifications to the various disclosed embodiments may be made, and other embodiments may be utilized, without departing from the spirit and scope of the present invention. The following detailed description is, therefore, not to be taken in a limiting sense.

Embodiments of the present disclosure include a system and methods for producing and displaying graphical elements on a display that relate to a sporting event. The graphical elements may be superimposed on top of video depicting the sporting event, thereby enhancing viewership of the event. The graphical elements typically may provide information relevant to key aspects of the sporting event. In embodiments of the present disclosure, a sporting event broadcast producer may provide viewers with enhanced information graphics, as disclosed herein, in order to add to the visual appeal of the broadcast and increase viewer engagement, especially for novice viewers that are less educated as to certain nuances of the sport. For example, referring to FIG. 1, the graphical elements in a football game may include a superimposed first down line 100, which demarcates and corresponds to first down marker 110.

As used herein, the term "broadcast" includes any method of video transmission, including via the Internet, radio frequency electromagnetic waves (such as VHF or UHF), satellite, cable, or any other known means of disseminating live or recorded video. Such transmission may include analog or digital formats. Included in the term "broadcast" is 3D television.

Figure 1:
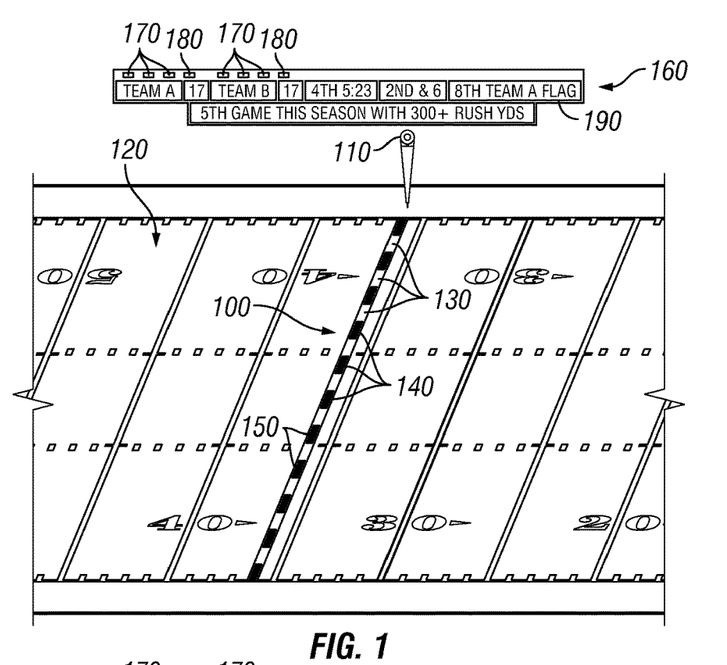
FIG. 1 depicts an embodiment of the present disclosure comprising graphical elements superimposed on a football field, which include a first down line having interlaid panels.

In embodiments of the present disclosure, the first down line 100 matches a team's color or colors. The first down line 100 may selectively be given a single color or multiple colors to match the team colors of whichever team is on offense. Alternatively, the sporting event broadcast producer may selectively produce and display a first down line 100 comprising colors that best coordinate with a team's colors, the color of the field of play 120, and other like factors. For example, in some football games and other sporting events, certain teams choose to wear uniforms having "throwback colors" or other special variations from the team's normal colors. The first down line 100 can selectively be made to match such colors By matching the color of the first down line 100 to a team's colors, viewers may be able to quickly ascertain which team currently is on offense. This feature may thus make it easier for novice viewers to follow the action of the sporting event and remain engaged in the broadcast. Additionally, the selected colors of the first down line 100 may improve the aesthetic nature of the displayed sporting event, thereby enhancing viewers' experience and enjoyment.

Embodiments of the present disclosure include a variety of first down line 100 designs that may be aesthetically pleasing to viewers. For example, the first down 100 depicted in FIG. 1 comprises a line composed of a first color 130 and interlaid panels 150 of a second color 140. The size of each panel 150 and proximity to each other may selectively be altered to suit the preferences of the broadcast provider. For example, the proportions of the colors in the first down line 100 can be altered to correspond to the proportions of the colors present on a team's uniform. An alternate embodiment of the present disclosure comprises the use of a third color, such as a team's insert color to form a series of perimeter grids encompassing smaller designs or shapes.

Figure 2:
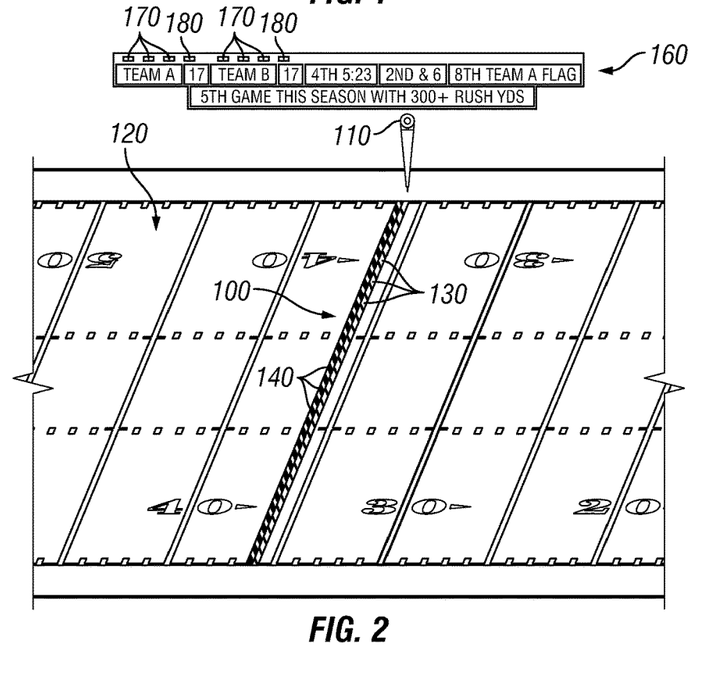
FIG. 2 depicts an embodiment of the present disclosure comprising graphical elements superimposed on a football field, which include a first down line having a dual offset diagonal line pattern.
Figure 3:
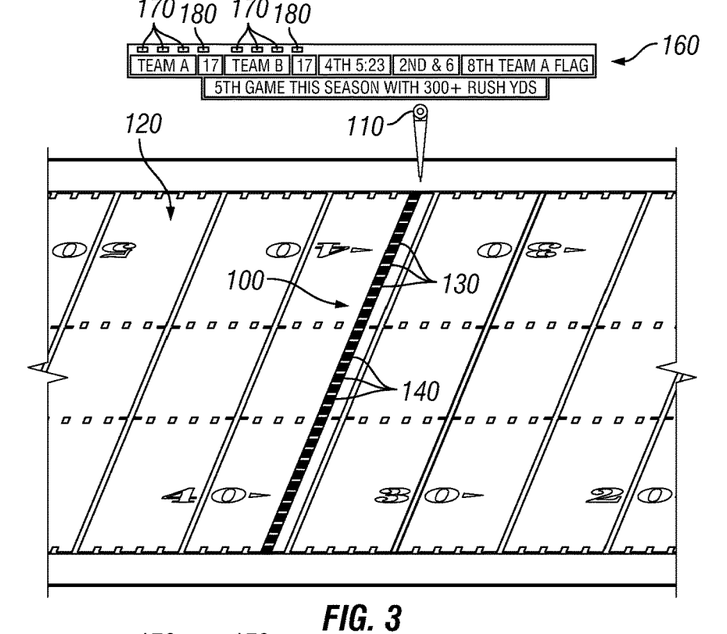
FIG. 3 depicts an embodiment of the present disclosure comprising graphical elements superimposed on a football field, which include a first down line having interspersed horizontal line segments.
Figure 4:
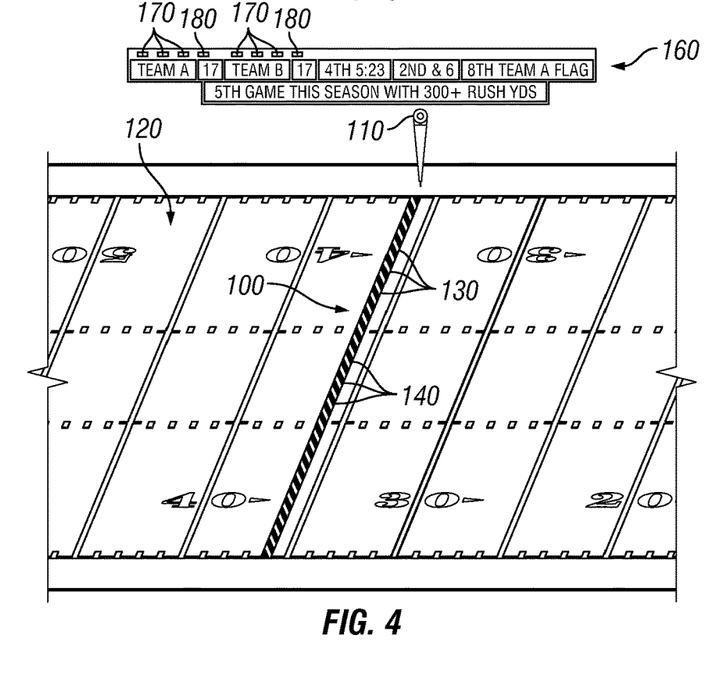
FIG. 4 depicts an embodiment of the present disclosure comprising graphical elements superimposed on a football field, which include a first down line having interspersed diagonal line segments.
Figure 7:
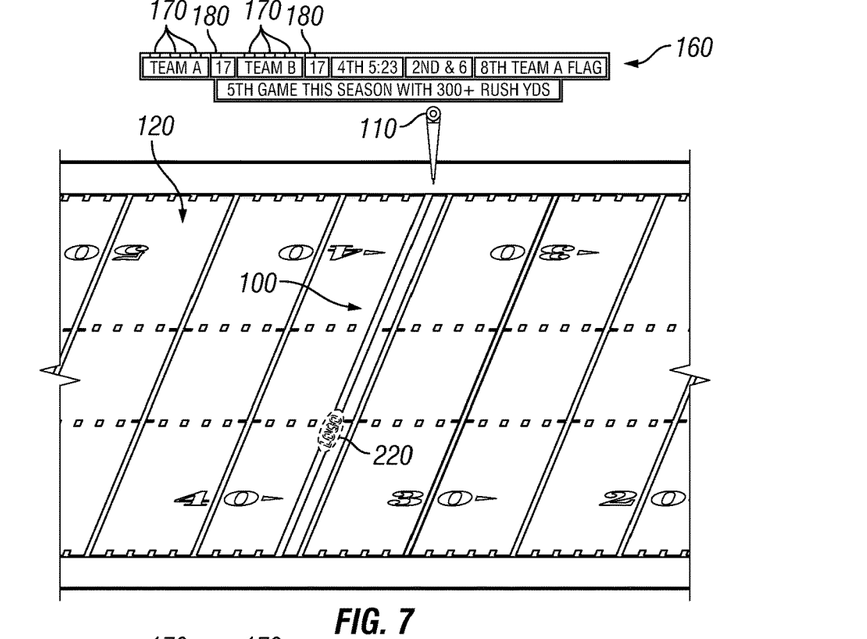
FIG. 7 depicts an embodiment of the present disclosure comprising graphical elements superimposed on a football field, which include a first down line having an advertiser's logo superimposed thereon.
Figure 8:
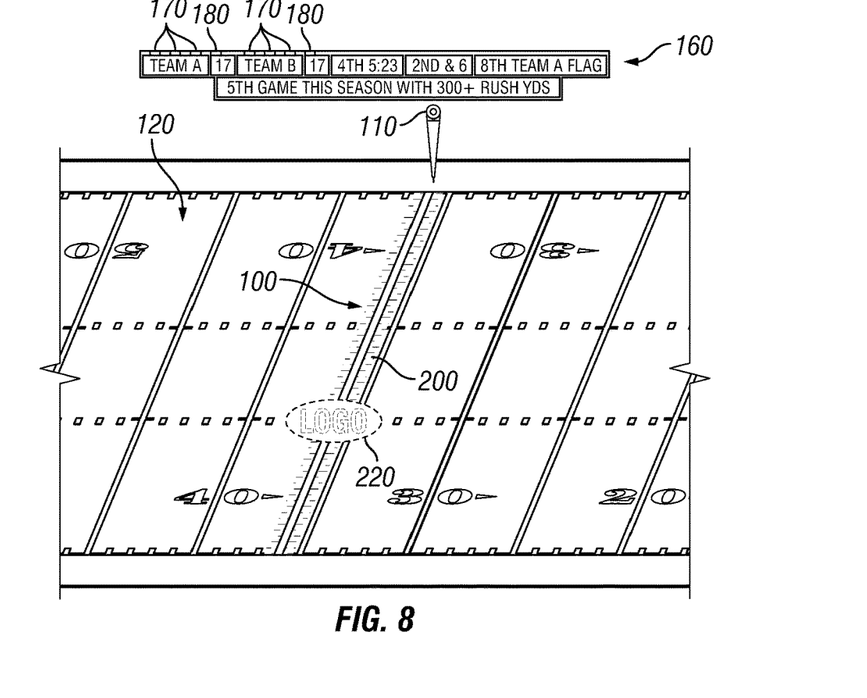
FIG. 8 depicts an embodiment of the present disclosure comprising graphical elements superimposed on a football field, which include a first down line having a superimposed gradient.

Referring now to FIG. 2, an alternate embodiment first down line 100 is depicted. In this embodiment, the first down line 100 comprises double adjacent vertical line segments having offset diagonal line patterns comprised of the first color 130 and second color 140. In alternative embodiments, any number of colors may be used for the diagonal line segments. Referring now to FIG. 3, embodiments of the first down line 100 comprise a solid color 140 having interspersed horizontal line segments of a secondary color 130. Referring now to FIG. 4, embodiments of the first down line 100 comprise a solid primary color 130 having interspersed diagonal line segments of a secondary color 140. As would be understood by one of ordinary skill in the art having the benefit of this disclosure, the primary color 130 and secondary color 140 may be chosen to maximize information content and aesthetic value of the graphics. Additionally, the spacing of interspersed diagonal or horizontal line segments may be varied as desired and to enhance the appearance of the first down line 100. Referring now to FIG. 7, embodiments of the first down line 100 comprise a solid line. In alternate embodiments first down line 100 further comprises a border composed of a second color. Referring now to FIG. 8, an alternate embodiment of the present disclosure comprise a first down line 100 that is highlighted by a superimposed gradient 200 adjacent thereto, which creates a glowing effect on either side of the first down line 100. The gradient 200 may be white or selectively comprise colors of the football team that currently has possession of the football. In embodiments, the gradient 200 is animated and selectively appears under circumstances designed to draw the viewers' attention. The gradient 200 comprises a color gradient which gradually transitions from transparency at its periphery to a solid or near-solid color adjacent to the first down line 100.

As would be understood by one of ordinary skill in the art having the benefit of this disclosure, first down line 100 may comprise any combination of horizontal, diagonal, and/or vertical lines segments, or any other design elements, incorporated into the first down line 100. In alternative embodiments, gradient 200 may be incorporated into any first down line design or other graphic elements. For example, a perimeter boundary line around a playing surface may be highlighted by gradient 200 during selected portions of a sporting event. In alternative embodiments, sub-elements of first down line 100 or other displayed elements may also be highlighted by a gradient. For example, individual horizontal stripes in first down line 100 may be given a glowing effect through the use of gradients. Such effects may be used to focus the viewers' attention or for aesthetic purposes as selected by the broadcast provider.

Embodiments of the present disclosure comprise a system and method to produce and present an information display graphic 160 of a sporting event. The information display graphic 160 may comprise a virtual score board that is superimposed on a viewer's display and may provide key facts regarding the broadcast sporting event. For example, the information display graphic 160 may provide the current score and number of timeouts remaining for each team. The facts displayed on the information display graphic 160 may be tailored for the sport. In cases where the sport being played is football, the information display graphic 160 may include information such as the down number and distance to the first down marker, the quarter number and remaining time, and penalty information. The number of timeouts remaining for each team may be presented as rectangles on the information display graphic 160 that appear illuminated when the corresponding team has timeouts remaining. As each timeout is used by the team, a corresponding timeout indicator 170 darkens to show that the timeout has been expended. In alternative embodiments, the timeout indicators 170 have a color that matches that of the corresponding team.

In alternate embodiments, and as a further example provided, methods and systems of the present disclosure may be applied to motorsports (such as NASCAR, Formula One, World Rally Championship, and the like). In embodiments, an arrow or other indicator (not depicted in the figures) is made to selectively appear behind a car of interest, such as behind the leader car or another car that is a subject of discussion during a broadcast. Additional information relevant to certain drivers or the sporting event may be presented in the information display graphic 160.

Embodiments of the present disclosure include a challenge indicator 180 that informs the viewer if either football team has any challenges available. In the embodiments depicted, the challenge indicator 180 comprises a rectangle located on the information display graphic 160 near timeout indicators 170 for that team. When the football game commences, and any time during the game that a team has a challenge available, the challenge indicator 180 remains illuminated. Upon the use of a team's challenge (typically accomplished by a coach throwing a challenge flag onto the field), and depending on the outcome of the challenge, that team may have expended its challenge and can no longer use it. At such point, the challenge indicator 180 will darken to signify that the corresponding team has used all of its challenges.

In embodiments of the present disclosure, the information display graphic 160 comprises a penalty information display 190 that indicates which team a penalty was called on and the number of penalties that team has accrued throughout the football game. The penalty information display 190 comprises a panel that is integrated into the information display graphic 160 as depicted in the figures. In alternate embodiments, penalty information display comprises a graphic resembling a yellow flag, a star, or any number of potential options known or developed in the art to call the viewers' attention to a penalty. The penalty information display 190 may display the cumulative number of yards a team has been penalized throughout the game or alternatively during a specific quarter. In embodiments of the present disclosure, the penalty information display 190 includes the name of the player who was penalized and the number of penalties that player has received in the sporting event. In cases where the sport being played is basketball, the penalty information display 190 may include the number of fouls called on a player and that player's name and number. In applying embodiments of the present disclosure to other sports, alerts for various types of infractions, fouls, or penalties may be displayed.

In embodiments of the present disclosure, the penalty information display 190 is animated to more effectively call the viewers' attention to a penalty call. For example, the penalty information display 190 can be configured to appear to expand out of the information display graphic 160 or can selectively appear to rotate and/or grow onto and rotate and/or shrink off the display. The penalty information display 190 may be configured to enter or exit the display in a variety of methods that are known in the art. In alternative embodiments, a brief flash (such as could be created by a camera flash or bright light) is made to appear on-screen at specific times. For example, the broadcast provider may create the flash effect whenever a football team scores a touchdown, whenever a penalty is assessed, whenever a challenge flag is thrown, or in response to other critical occurrences during the sporting event. The flash effect may be superimposed over the entire display or just a localized area of the playing surface or other display area. For example, upon a team scoring a touchdown in a football game, a flash effect could be superimposed over the end zone. In some embodiments, the flash is made to be white. However, other colors may be applied and fall under the scope of this disclosure.

In an alternate embodiment of the present disclosure, additional display elements may be produced by the system disclosed herein to provide information relevant to the viewer regarding key facts of the sporting event. In embodiments, the edges of the playing surface (i.e. field, arena, court, pitch, or the like) are bordered by a superimposed perimeter border (not depicted in the figures) that has a color that matches one or more colors of the team that currently has possession of the ball and/or is on offense. For example, in a soccer game, a rectangle outline (which, due to perspective, may appear on a display as a trapezoid or other shape) bordering the field of play 120 may match the color of the team that currently has the ball. Similar, in a basketball game, the basketball court may be bordered by a superimposed rectangle outline with colors that match those of the team that has possession of the basketball. As another example, during a hockey match, the outline of the hockey rink could be superimposed by a perimeter line with colors matching those of the team that has the hockey puck.

Systems and methods of the present disclosure include the use of embedded advertising during a broadcast of a sporting event, which advertising may be integrated with the displayed information graphics. As would be appreciated by a person of ordinary skill in the art having the benefit of this disclosure, animated or static advertisements can be most effective when presented while the level of viewer engagement is relatively high. Thus, methods of the present disclosure include "pop-out" advertising that appears to slide out, pop out, or appear out of the first down line 100 or the information display graphic 160. Such advertisements can be configured to appear at brief pauses in action during an event so as to not disrupt or distract the viewer from the competition. For example, advertisements may appear between plays during a football game, between pitches in a baseball game, between free throws in a basketball game, or during breaks in the action during a soccer game. First down line 100 may be animated to be given the appearance that it is spinning. Referring now to FIG. 2, offset diagonal line segments may form a helical appearance, which creates an appearance similar to a drill bit, so when the first down line 100 spins, it looks like a spinning drill bit. Any first down line design may likewise be given a spinning appearance. Such an effect may be used to call the viewers' attention to the first down line specifically, to the broadcast generally, or to other on-screen elements. The spinning effect may be implemented to attract viewers' attention prior to an advertisement, during an important time in the sporting event, or during any other time as selected by the broadcast provider.

Advertising may be superimposed on the display in a relatively inconspicuous screen location so as to not obscure on-field action in the sporting event. Such advertising may remain on-screen for relatively long durations (e.g. 10 minutes or more). Such static advertising may be supplemented with sounds and/or animation at certain times to call the viewers' attention. The sounds and animation may be specific to the advertiser's product and/or marketing efforts. The advertising sound component may include script-reading by the broadcast play-by-play or color commentators (e.g. "This first down is brought to you by ABC Company"). Likewise, other action-specific advertisements fall under the scope of this disclosure. For example, when a team scores points, an advertisement specific to that event may be triggered. In the case of a touchdown during a football game, a graphic may be displayed in the end zone (or a part thereof) or elsewhere on the display. A sound component may be included in the advertising that identifies the touchdown and names the advertiser (e.g. "This touchdown is sponsored by ABC Company").

In embodiments of the present disclosure, presented advertisements may be static images or may be animated and/or video, with or without complementary audio playback. Such advertisements may comprise presentment of an advertiser's logo or symbol placed in strategic locations on the viewers' display. The advertisements may be selectively tailored for any specific viewing audience. For example, different advertisements may be broadcast in different regions based on the demographics and preferences of viewers in each region.

Figure 5:
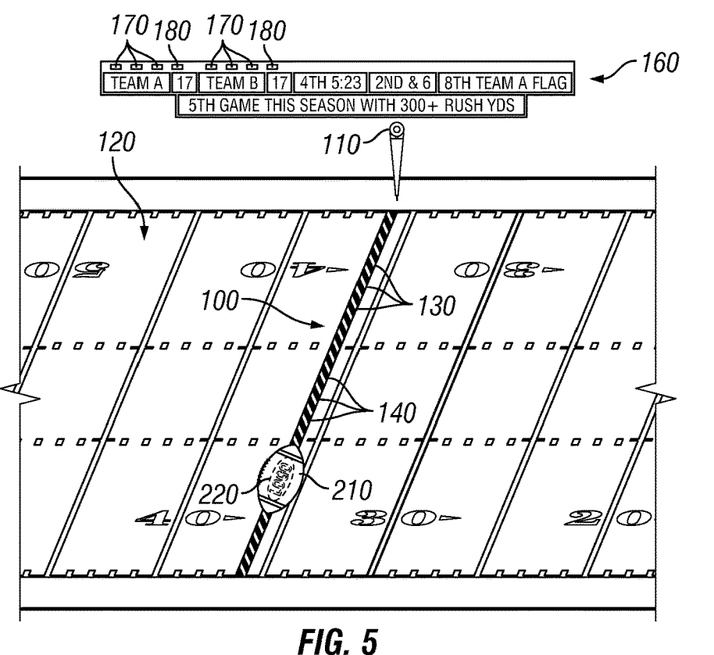
FIG. 5 depicts an embodiment of the present disclosure comprising graphical elements superimposed on a football field, which include a first down line having a football and an advertiser's logo superimposed thereon.
Figure 6:
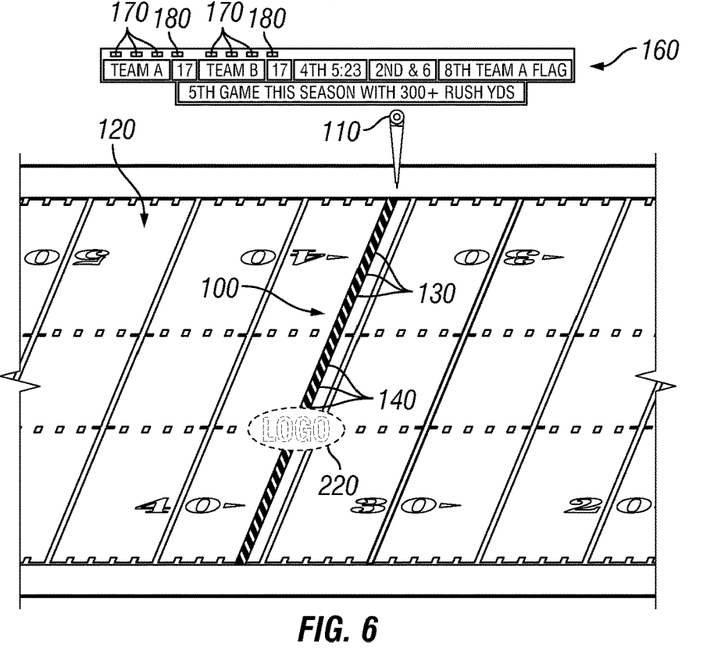
FIG. 6 depicts an embodiment of the present disclosure comprising graphical elements superimposed on a football field, which include a first down line having interspersed diagonal line segments and an advertiser's logo superimposed thereon.

Referring now to FIGS. 5 and 6, a football 210 may be rendered on the viewers' screen on or near the first down line 100. As depicted in FIG. 5, a corporate logo 220 may be superimposed upon the football 210. The football 210 may appear in this state only during breaks in action of the sporting event, or may continually appear on screen during the sporting event. At certain times, such as breaks in the action of the sporting event, the football 210 and logo 220 may be animated to further catch the viewers' attention. As depicted in FIG. 6, the logo 220 may be enlarged to highlight the sponsor of the advertisement. Similarly, as depicted in FIG. 7, logo 220 may be superimposed directly on the first down line 100. Alternatively, logo 220 may be placed elsewhere on the field of play 120. As depicted in FIG. 8, logo 220 may be animated and/or enlarged so as to direct the viewers' attention to the logo 220. Such animation and/or enlargement of logo 220 may coincide with creation of halo 200, which may act to further draw viewers' attention to the logo 220. In alternative embodiments, advertisements, including logos and the like, may similarly be displayed in conjunction with specific sport objects (e.g., a baseball, a basketball or a soccer ball).

As a further example, embodiments of the present disclosure comprise advertisements during motorsport broadcasts. Such advertisements may be incorporated with the information display graphic 160 or the arrow that is made to appear behind a vehicle of interest.

In operation, an operator provides certain inputs to the system during a sporting event, which inputs correspond to certain useful information that may subsequently be displayed on-screen in a graphical manner. Such inputs may include the score, field position, which team is on offense, how many timeouts each team currently has remaining, how much time is remaining, penalty information, player information, and any other information that the operator deems important to viewers. Such inputs may be made manually by a person or people observing the sporting event, or may be made automatically by a system configured to automatically detect relevant circumstances in the sporting event. For example, RFID tags or the like may be embedded in the first down marker 120. RFID readers may detect the location of first down marker 120 and communicate same to the system, thereby inputting the first down marker location. Alternatively, a GPS device may be installed in the first down marker and a communication module may transmit its present location to the system, thereby inputting the location of the first down marker. An accelerometer attached to a referee's penalty flag, a referee's hat, or a coach's challenge flag could indicate to the system when any of those objects are thrown, each of which has a defined meaning in the sporting event. Other known means of inputting information related to the sporting event would be clear to a person of ordinary skill in the art having the benefit of this disclosure.

The methods and systems disclosed herein may present certain advantages over the prior art. As described herein, the enhanced graphics of the present disclosure may increase viewer engagement, leading to higher viewership and increased advertising revenue. This advantage may be more pronounced for the segment of viewers that constitutes novice viewers of that particular sporting event because the information is presented in an easily-digestible manner and may assist a viewer to follow the action of the event.

Another advantage of the present disclosure is that viewers may be able to follow a sporting event even while preoccupied with other activities. For example, if a viewer is talking on the telephone during an athletic event, she might typically mute her television to not interfere with the telephone conversation. The systems and methods disclosed herein make critical information available to the viewer so that she can still follow the action, even if only at a glance at a time. Similarly, sporting events are often broadcast in bars, restaurants, and other locations where the audio component of the broadcast is muted. By implementing the methods and systems of the present disclosure, viewers may be able to stay informed and engaged in the broadcast, even without the benefit of the audio.

Another advantage presented by the methods and systems disclosed herein are potential increased advertising revenue. Often viewers will record a broadcast of a game for delayed playback on a digital video recorder or similar device. When this delayed playback occurs, the viewer is able to fast forward or skip the commercials that are present during breaks in the sports programming. As a result, fewer viewers watch the commercials. The in-game advertisements of the present disclosure may solve or mitigate this problem by showing such advertisements while the viewers are engaged with the game and thus paying full attention to the broadcast.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. A method of displaying information related to a football game, comprising:
    at a computer processor, superimposing a line across a width of an image of a playing field, the line indicating a first down line, wherein the first down line comprises two colors in interspersed line segments, the colors being selected by the computer processor to correspond to team colors of a first football team that is on offense in the football game, such that the first down line comprises the colors in proportions that respectively correspond to proportions of the colors on uniforms worn by the first football team;
    superimposing a color gradient adjacent to and on either side of the first down line on the image of the playing field, wherein the color gradient comprises secondary lines perpendicular to the first down line;

receiving an input at the computer processor indicating which of the first football team or a second football team is on offense;

at the computer processor, selecting two new colors to correspond to two uniform colors of the second football team in the football game in response to a change of offensive possession in the football game;

after a play has completed and prior to a subsequent play beginning, superimposing a logo of an advertiser at the first down line; and at the computer processor, changing the colors of the interspersed line segments of the first down line to the new colors, whereupon the first down line is altered to comprise the new colors in proportions that respectively correspond to proportions of the colors on uniforms worn by the second football team.

2. The method of claim 1, further comprising:

superimposing an information display graphic that displays: a score of the football game, a plurality of timeout indicators for each football team, and a challenge indicator for each football team.

3. The method of claim 2, further comprising:

superimposing an illumination effect on the challenge indicators and selectively removing the illumination effect from one of the challenge indicators if a football coach has expended a challenge of said coach's football team.

4. The method of claim 1, further comprising:

superimposing a penalty information display that displays a cumulative number of yards one of the first team or the second team has been penalized throughout the football game.

5. The method of claim 4, further comprising superimposing an animated penalty graphic following a penalty call in the football game.

6. The method of claim 1, further comprising:

superimposing a logo of an advertiser onto the line on the image of the playing field.

7. The method of claim 1, further comprising:

superimposing a rendered image of a football onto the line on the image of the playing field.

8. The method of claim 1, further comprising:

superimposing a flash effect onto at least part of the image of the playing field in response to pre-selected conditions of the football game.

\* \* \* \* \*